United States Patent
Ehashi et al.

(10) Patent No.: US 12,305,255 B2
(45) Date of Patent: *May 20, 2025

(54) METHOD FOR PRODUCING GRAIN-ORIENTED ELECTRICAL STEEL SHEET

(71) Applicant: JFE STEEL CORPORATION, Tokyo (JP)

(72) Inventors: Yuiko Ehashi, Tokyo (JP); Masanori Takenaka, Tokyo (JP); Hirokazu Sugihara, Tokyo (JP); Soshi Yoshimoto, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 836 days.

This patent is subject to a terminal disclaimer.

(21) Appl. No.: 17/603,877

(22) PCT Filed: Apr. 22, 2020

(86) PCT No.: PCT/JP2020/017313
§ 371 (c)(1),
(2) Date: Oct. 14, 2021

(87) PCT Pub. No.: WO2020/218329
PCT Pub. Date: Oct. 29, 2020

(65) Prior Publication Data
US 2022/0195555 A1    Jun. 23, 2022

(30) Foreign Application Priority Data
Apr. 23, 2019  (JP) ................. 2019-081644

(51) Int. Cl.
| | |
|---|---|
| *C21D 9/46* | (2006.01) |
| *C21D 6/00* | (2006.01) |
| *C21D 8/00* | (2006.01) |
| *C21D 8/12* | (2006.01) |
| *C22C 38/00* | (2006.01) |
| *C22C 38/04* | (2006.01) |
| *C22C 38/06* | (2006.01) |
| *C22C 38/08* | (2006.01) |
| *C22C 38/16* | (2006.01) |
| *C22C 38/22* | (2006.01) |
| *C22C 38/26* | (2006.01) |
| *C22C 38/34* | (2006.01) |
| *H01F 1/147* | (2006.01) |

(52) U.S. Cl.
CPC ............... *C21D 9/46* (2013.01); *C21D 6/001* (2013.01); *C21D 6/002* (2013.01); *C21D 6/005* (2013.01); *C21D 6/008* (2013.01); *C21D 8/005* (2013.01); *C21D 8/1222* (2013.01); *C21D 8/1233* (2013.01); *C21D 8/1266* (2013.01); *C21D 8/1272* (2013.01); *C21D 8/1283* (2013.01); *C22C 38/001* (2013.01); *C22C 38/002* (2013.01); *C22C 38/008* (2013.01); *C22C 38/04* (2013.01); *C22C 38/06* (2013.01); *C22C 38/08* (2013.01); *C22C 38/16* (2013.01); *C22C 38/22* (2013.01); *C22C 38/26* (2013.01); *C22C 38/34* (2013.01); *H01F 1/14775* (2013.01); *C22C 2202/02* (2013.01)

(58) Field of Classification Search
CPC ........................................................... C21D 9/46
See application file for complete search history.

(56) References Cited

U.S. PATENT DOCUMENTS

| | | | |
|---|---|---|---|
| 3,932,234 A | 1/1976 | Imanaka et al. | |
| 2013/0087249 A1 | 4/2013 | Takenaka et al. | |
| 2015/0170812 A1 | 6/2015 | Murakami et al. | |
| 2019/0010564 A1 | 1/2019 | Yoshimoto et al. | |
| 2020/0032363 A1 | 1/2020 | Ko et al. | |
| 2022/0042137 A1* | 2/2022 | Ehashi | C22C 38/04 |
| 2024/0271254 A1* | 8/2024 | Takenaka | C22C 38/004 |

FOREIGN PATENT DOCUMENTS

| | | |
|---|---|---|
| CN | 1978673 A | 6/2007 |
| CN | 102947471 A | 2/2013 |
| EP | 2 940 159 A1 | 11/2015 |

(Continued)

OTHER PUBLICATIONS

Fukagawa, Tomoki, and Hiroyoshi Yashiki. "Effect of Hot-band Annealing Condition on Secondary Recrystallization in Grain-oriented 2.3% Si-1.7% Mn Steel." ISIJ international 40, No. 4 (2000): pp. 402-408. (Year: 2000).*

(Continued)

*Primary Examiner* — Jophy S. Koshy
(74) *Attorney, Agent, or Firm* — Oliff PLC

(57) ABSTRACT

A grain oriented electrical steel sheet is produced by heating a steel slab containing, by mass %, C:0.02-0.10%, Si:2.0-5.0%, Mn:0.01-1.00%, sol. Al:0.01-0.04%, N:0.004-0.020% and S+Se:0.002-0.040% to a temperature of higher than 1280° C., and subjecting the sheet to a hot rolling, a hot-band annealing, a single cold rolling or two or more cold rollings having an intermediate annealing between each cold rolling and a primary recrystallization annealing combined with a decarburization annealing, applying an annealing separator onto a steel sheet surface, and subjecting the sheet to a finish annealing and a flattening annealing, a rapid cooling is conducted at an average cooling rate of not less than 200° C./s from 800° C. to 300° C. in the cooling process from a maximum achieving temperature in at least one annealing of the hot-band annealing and the intermediate annealing.

8 Claims, No Drawings

(56) References Cited

FOREIGN PATENT DOCUMENTS

| | | |
|---|---|---|
| EP | 3 428 294 A1 | 1/2019 |
| JP | S40-015644 B | 7/1965 |
| JP | S51-013469 B2 | 4/1976 |
| JP | H05-214445 A | 8/1993 |
| JP | H09-104923 A | 4/1997 |
| JP | H10-121135 A | 5/1998 |
| JP | 2000-129356 A | 5/2000 |
| JP | 2001-40449 A | 2/2001 |
| JP | 2003-253335 A | 9/2003 |
| JP | 2005-262217 A | 9/2005 |
| JP | 2005-344156 A | 12/2005 |
| JP | 2007-138199 A | 6/2007 |
| JP | 2011-052302 A | 3/2011 |
| JP | 2013-47383 A | 3/2013 |
| JP | 2016-156070 A | 9/2016 |
| JP | 2018-066065 A | 4/2018 |
| KR | 10-2018-0074455 A | 7/2018 |
| WO | 2014/013615 A1 | 1/2014 |
| WO | 2020/218328 A1 | 10/2020 |

OTHER PUBLICATIONS

Jeong, Y. H., S. B. Kim, S. H. Myung, and N. H. Heo. "Intermediate annealing temperature and the number of final {110} grains in 3% silicon steels." Journal of applied physics 101, No. 9 (2007). (Year: 2007).*
English machine translation of JP 2005-262217 A of Wada (Year: 2005).*
Jul. 21, 2020 Search Report issued in International Patent Application No. PCT/JP2020/017313.
Apr. 3, 2023 Office Action issued in Korean Patent Application No. 10-2021-7033366.
"Standard Practice for Using Significant Digits in Test Data to Determine Conformance with Specifications", Designation: E29-13, An American National Standard, pp. 1-5.
May 9, 2022 Extended Search Report issued in European Patent Application No. 20796035.2.
Sep. 30, 2022 Office Action issued in Chinese Patent Application No. 202080029141.X.
Oct. 11, 2024 Extended European Search Report issued in European Patent Application No. 22811383.3.
Oct. 9, 2024 Office Action issued in U.S. Appl. No. 17/604,830.

* cited by examiner

METHOD FOR PRODUCING GRAIN-ORIENTED ELECTRICAL STEEL SHEET

TECHNICAL FIELD

This invention relates to a method for producing a grain-oriented electrical steel sheet favorably used as an iron core material or the like for a transformer.

BACKGROUND ART

Grain-oriented electrical steel sheets are soft magnetic material used as an iron core material for transformers, electric generators and the like. Having a crystal structure where <001> orientation being a magnetization easy axis of iron is highly aligned in a rolling direction of a steel sheet, such a grain-oriented steel sheet is characterized by being excellent in magnetic properties. The crystal structure is formed, in a finish annealing of the production process of the grain-oriented electrical steel sheet, by using grain boundary energy to preferentially cause secondary recrystallization of crystal grains of {110}<001> orientation, so-called Goss orientation and achieve enormous growth thereof.

Common methods for causing the secondary recrystallization generally include a technique of utilizing precipitates called as an inhibitor. For example, Patent Literature 1 discloses a method of utilizing AlN or MnS as the inhibitor, and Patent Literature 2 discloses a method of utilizing MnS or MnSe as the inhibitor, both of which are industrially put into practice.

In the techniques of utilizing the inhibitor, a method of improving a texture by increasing a cooling rate in a hot-band annealing and an intermediate annealing to control precipitation of carbide is proposed as a method for producing a grain-oriented electrical steel sheet having excellent magnetic properties. For example, Patent Literature 3 proposes increasing a cooling rate in a hot-band annealing to increase C in a solid-solution state in cold rolling. In this technique, however, the cooling rate in an example is 45° C./s at maximum, and rapid cooling of not less than 100° C./s is not conducted. It is assumed due to the fact that the cooling rate of less than 100° C./s has been considered sufficient for the control of the carbide and there has been no cooling device capable of attaining a cooling rate of more than the above value.

Whereas, developments of the cooling technique for thin steel sheets have been advanced in recent years. For example, Patent Literature 4 discloses a quench-hardening device capable of suppressing a slowdown of a cooling rate for a metal plate while preventing shape failure generated in the metal plate during the quench-hardening in a continuous annealing installation for continuously threading the metal plate to conduct the annealing. The quench-hardening device aims to provide a high-strength steel sheet having a desired strength by performing rapid cooling to control the structure. However, the rapid cooling has not been applied to grain-oriented electrical steel sheets, where high strength is not required.

CITATION LIST

Patent Literature

Patent Literature 1: JP-B-S40-015644
Patent Literature 2: JP-B-S51-013469
Patent Literature 3: JP-A-H10-121135
Patent Literature 4: JP-A-2018-066065

SUMMARY OF INVENTION

Technical Problem

It is, therefore, an object of the invention to propose a method for producing a grain-oriented electrical steel sheet having very excellent magnetic properties comprising
applying the above rapid cooling technique to a production of a grain-oriented electrical steel sheet using a raw material containing an inhibitor forming ingredient and
using a high-speed cooling effect different from conventional methods of increasing solid-soluted C or finely dividing the carbide.

Solution to Problem

The inventors have made various studies on an influence of a cooling rate in a hot-band annealing or the like upon magnetic properties of a grain-oriented electrical steel sheet, in a production method of the grain-oriented electrical steel sheet using a raw material containing an inhibitor-forming ingredient. As a result, it has been found out that, by increasing the cooling rate in the hot-band annealing, intermediate annealing and the like before cold rolling as compared to conventional ones, concretely increasing the cooling rate from 800° C. to 300° C. to not less than 200° C./s, slip system of dislocation in the cold rolling is changed to improve primary recrystallization texture, whereby the magnetic properties are largely improved, and thus the invention has been accomplished.

That is, the invention proposes a method for producing a grain-oriented electrical steel sheet comprising a series of steps of
heating a steel slab having a component composition comprising C: 0.02 to 0.10 mass %, Si: 2.0 to 5.0 mass %, Mn: 0.01 to 1.00 mass %, sol. Al: 0.01 to 0.04 mass %, N: 0.004 to 0.020 mass %, one or two selected from S and Se: 0.002 to 0.040 mass % in total, and the remainder being Fe and inevitable impurities to a temperature higher than 1280° C.,
hot rolling the slab to form a hot-rolled sheet,
subjecting the hot-rolled sheet to a hot-band annealing and then a single cold rolling or two or more cold rollings having an intermediate annealing between each cold rolling to form a cold-rolled sheet having a final sheet thickness,
subjecting the cold-rolled sheet to a primary recrystallization annealing combined with a decarburization annealing,
applying an annealing separator onto a surface of the steel sheet, and
subjecting the steel sheet to a finish annealing and then to a flattening annealing, in which
a rapid cooling is conducted at an average cooling rate of not less than 200° C./s from 800° C. to 300° C. in a cooling process from a maximum achieving temperature in at least one process of the hot-band annealing and the intermediate annealing.

The method for producing a grain-oriented electrical steel sheet according to the invention is characterized in that, subsequently to the rapid cooling, a cooling is conducted from 300° C. to 100° C. at an average cooling rate of 5 to 40° C./s.

The method for producing a grain-oriented electrical steel sheet according to the invention is characterized in that a heating rate between 500° C. and 700° C. in a heating process of the primary recrystallization annealing combined with the decarburization annealing is not less than 500° C./s.

The method for producing a grain-oriented electrical steel sheet according to the invention is characterized in that, in a heating process of the finish annealing, after a temperature holding treatment holding any temperature between 800° C. and 950° C. for 5 to 200 hours, or after a heating is conducted between 800° C. and 950° C. at an average heating rate of not more than 5° C./hr to develop secondary recrystallization and further continued up to a temperature not lower than 1100° C. to complete the secondary recrystallization, a purification treatment of holding the temperature for not less than 2 hours is conducted.

The steel slab used in the method for producing a grain-oriented electrical steel sheet according to the invention is characterized by containing one or more selected from Cr: 0.01 to 0.50 mass %, Cu: 0.01 to 0.50 mass %, Ni: 0.01 to 0.50 mass %, Bi: 0.005 to 0.50 mass %, B: 0.0002 to 0.0025 mass %, Nb: 0.0010 to 0.0100 mass %, Sn: 0.010 to 0.400 mass %, Sb: 0.010 to 0.150 mass %, Mo: 0.010 to 0.200 mass %, P: 0.010 to 0.150 mass %, V: 0.0005 to 0.0100 mass % and Ti: 0.0005 to 0.0100 mass % in addition to the above component composition.

Advantageous Effects of Invention

According to the invention, a grain-oriented electrical steel sheet having excellent magnetic properties can be produced stably by using a raw material containing an inhibitor-forming ingredient and using a high-speed cooling effect different from the conventional methods of increasing the solid-soluted C or finely dividing carbide, which has a significant effect on industry.

DESCRIPTION OF EMBODIMENTS

Explanation will be made to experiments leading to the invention.

<Experiment 1>

A steel slab containing C: 0.065 mass %, Si: 3.60 mass %, Mn: 0.10 mass %, sol. Al: 0.022 mass %, N: 0.0080 mass %, S: 0.004 mass % and Se: 0.020 mass % is produced by a continuous casting method, reheated to a temperature of 1420° C. and hot rolled to form a hot-rolled sheet having a sheet thickness of 2.6 mm. Then, the hot-rolled sheet is subjected to a hot-band annealing with a maximum achieving temperature (soaking temperature) of 1050° C. In this case, a cooling process in the hot-band annealing from 1050° C. to room temperature is divided into three zones of 1000 to 800° C., 800 to 300° C. and 300 to 100° C., and cooling is performed by changing an average cooling rate of each zone, as shown in Table 1. Then, the steel sheet is subjected to the first cold rolling to have a middle sheet thickness of 1.6 mm, an intermediate annealing at 1100° C. and the second cold rolling to form a cold-rolled sheet having a final sheet thickness of 0.23 mm. The cold-rolled sheet is thereafter subjected to a primary recrystallization annealing combined with a decarburization annealing in a wet atmosphere of 50 vol % $H_2$-50 vol % $N_2$ with a dew point of 55° C. at a soaking temperature of 840° C. for a soaking time of 150 seconds. Then, the steel sheet is coated on its surface with an annealing separator composed mainly of MgO and subjected to a finish annealing of heating (no temperature holding) between 800° C. and 950° C. at a heating rate of 20° C./hr to develop a secondary recrystallization, heating to 1200° C. at a heating rate of 20° C./hr between 950° C. and 1050° C. to complete the secondary recrystallization and then performing a purification treatment of holding at such a temperature in a hydrogen atmosphere for 5 hours.

A sample is taken out from the thus-obtained steel sheet after the finish annealing to measure a magnetic flux density $B_g$ (magnetic flux density in excitation at 800 A/m) by a method described in JIS C2550, and the result is also shown in Table 1. As seen from the result, the magnetic flux density is largely increased by conducting rapid cooling at an average cooling rate from 800° C. to 300° C. of not less than 200° C./s in the cooling process of the hot-band annealing.

TABLE 1

| | Cooling rate in hot-band annealing (° C./s) | | | Magnetic | |
| --- | --- | --- | --- | --- | --- |
| No. | 1000° C. to 800° C. | 800° C. to 300° C. | 300° C. to 100° C. | flux density $B_8$(T) | Remarks |
| 1 | 10 | 10 | 10 | 1.887 | Comparative Example |
| 2 | 50 | 10 | 10 | 1.885 | Comparative Example |
| 3 | 100 | 10 | 10 | 1.886 | Comparative Example |
| 4 | 200 | 10 | 10 | 1.888 | Comparative Example |
| 5 | 500 | 10 | 10 | 1.887 | Comparative Example |
| 6 | 1000 | 10 | 10 | 1.885 | Comparative Example |
| 7 | 10 | 50 | 50 | 1.894 | Comparative Example |
| 8 | 50 | 50 | 50 | 1.895 | Comparative Example |
| 9 | 100 | 50 | 50 | 1.897 | Comparative Example |
| 10 | 200 | 50 | 50 | 1.896 | Comparative Example |
| 11 | 500 | 50 | 50 | 1.894 | Comparative Example |
| 12 | 1000 | 50 | 50 | 1.895 | Comparative Example |
| 13 | 10 | 200 | 200 | 1.916 | Inventive Example |
| 14 | 50 | 200 | 200 | 1.918 | Inventive Example |
| 15 | 100 | 200 | 200 | 1.914 | Inventive Example |
| 16 | 200 | 200 | 200 | 1.918 | Inventive Example |
| 17 | 200 | 200 | 30 | 1.920 | Inventive Example |
| 18 | 500 | 200 | 200 | 1.917 | Inventive Example |
| 19 | 1000 | 200 | 200 | 1.918 | Inventive Example |
| 20 | 10 | 500 | 500 | 1.924 | Inventive Example |
| 21 | 50 | 500 | 500 | 1.927 | Inventive Example |
| 22 | 100 | 500 | 500 | 1.929 | Inventive Example |
| 23 | 200 | 500 | 500 | 1.920 | Inventive Example |
| 24 | 500 | 500 | 500 | 1.922 | Inventive Example |
| 25 | 500 | 500 | 30 | 1.925 | Inventive Example |
| 26 | 1000 | 500 | 500 | 1.928 | Inventive Example |
| 27 | 10 | 1000 | 1000 | 1.931 | Inventive Example |
| 28 | 50 | 1000 | 1000 | 1.929 | Inventive Example |
| 29 | 100 | 1000 | 1000 | 1.930 | Inventive Example |
| 30 | 200 | 1000 | 1000 | 1.933 | Inventive Example |
| 31 | 500 | 1000 | 1000 | 1.933 | Inventive Example |
| 32 | 1000 | 1000 | 1000 | 1.934 | Inventive Example |
| 33 | 1000 | 1000 | 30 | 1.936 | Inventive Example |

Although the mechanism of the increase in the magnetic flux density caused by increasing the average cooling rate from 800° C. to 300° C. to not less than 200° C./s in the cooling process of the hot-band annealing as mentioned above when using raw materials containing an inhibitor-forming ingredient has not been clear yet, the inventors consider it as follows.

The temperature zone from 800° C. to 300° C. in the cooling process of the hot-band annealing has a large influence on the precipitation state of carbide, and thus cooling has been conducted at about 100° C./s in the temperature zone for the purpose of increasing solid-soluted C or increasing fine carbide. However, the above mechanism of improving the magnetic properties is considered not to be due to the increase of the solid-soluted C or fine carbide.

The steel sheet having been subjected to the hot-band annealing is before the process of decarburization annealing (primary recrystallization annealing) and has a high C content, and thus part of the steel sheet causes reversible transformation due to heating in the annealing and is changed from α-phase to γ-phase. The γ-phase after the transformation is different from the surrounding α-phase in crystal structure (γ-phase is FCC and α-phase is BCC) as well as thermal expansion coefficient. When rapid cooling is performed from such a state at not less than 200° C./s, the γ-phase is shrunk to remain due to the supercooling without transforming into α-phase. Therefore, unusual strain is caused in a phase interface between γ-phase and α-phase due to the difference in thermal expansion coefficient. As a result, the slip system of dislocation in the subsequent cold rolling process is changed to increase {411} orientation grains of the steel sheet after the primary recrystallization annealing (decarburization annealing) and improve the texture, which is considered to improve the magnetic properties. Moreover, it is considered that strain is caused in the phase interface even at a cooling rate of not more than 100° C./s, but the above effect cannot be obtained sufficiently because the strain is easily eliminated due to the slow cooling rate.

On the other hand, further improvement in magnetic properties is recognized by conducting cooling from 300° C. to 100° C. subsequent to the above rapid cooling at an average cooling rate within 5 to 40° C./s. This is considered due to the fact that martensite transformation of the residual γ-phase is caused by such a slow cooling to introduce higher strain and thereby more improve the primary recrystallization texture. It is well-known that the martensite transformation of γ-phase is caused by rapid cooling. When the cooling to lower than 100° C. is conducted by the rapid cooling of not less than 200° C./s, the steel sheet is supercooled at the state of γ-phase, and hence it is thought that the martensite transformation is rather hard to be caused.

<Experiment 2>

A steel having a component composition comprising C: 0.045 mass %, Si: 3.40 mass %, Mn: 0.05 mass %, sol. Al: 0.020 mass %, N: 0.0080 mass %, S: 0.005 mass %, Se: 0.016 mass % and the remainder being Fe and inevitable impurities is melted in a vacuum melting furnace and cast into a steel ingot. The steel ingot is heated to a temperature of 1350° C. and hot rolled to form a hot-rolled sheet having a sheet thickness of 2.3 mm. The hot-sheet is subjected to a hot-band annealing with a maximum achieving temperature of 1000° C. Then, the sheet is subjected to the first cold rolling to roll to a middle sheet thickness of 1.6 mm and an intermediate annealing with a maximum achieving temperature of 1050° C. The cooling process from 1050° C. of the intermediate annealing to room temperature is conducted at an average cooling rate of 10° C./s between 1050° C. and 800° C., and then at the average cooling rate of 30° C./s between 300° C. and 100° C., and variously changing the average cooling rate between 800° C. and 300° C. of the above temperature zone as shown in Table 2. Thereafter, the second cold rolling (final cold rolling) is conducted to obtain a cold-rolled sheet having a final sheet thickness of 0.23 mm, and the cold-rolled sheet is subjected to a primary recrystallization annealing combined with a decarburization annealing in a wet atmosphere of 50 vol % $H_2$-50 vol % $N_2$ with a dew point of 55° C. at a soaking temperature of 840° C. for a soaking time of 120 seconds. In this case, the average heating rate between 500° C. and 700° C. in the heating process of the primary recrystallization annealing is changed within the range of 300 to 1000° C./s. An annealing separator composed mainly of MgO is applied to the steel sheet surface, and then the sheet is subjected to a finish annealing by heating (no temperature-holding) between 800° C. and 950° C. at a heating rate of 30° C./hr to develop secondary recrystallization, subsequently heating to 1200° C. at a heating rate of 20° C./hr between 950° C. and 1050° C. to complete secondary recrystallization and then performing a purification treatment of holding the sheet at the temperature in a hydrogen atmosphere for 5 hours.

A sample is taken out from the thus-obtained steel sheet after the finish annealing, and a magnetic flux density $B_8$(magnetic flux density in the excitation at 800 A/m) thereof is measured by a method described in JIS C2550, and the measurement results are also shown in Table 2. As seen from the results, the magnetic flux density is largely increased by conducting the rapid cooling at an average cooling rate of not less than 200° C./s between 800° C. and 300° C. in the cooling process of the intermediate annealing and heating at a heating rate of not less than 500° C./s between 500° C. and 700° C. in the heating process of the primary recrystallization annealing subsequent to cold rolling.

TABLE 2

| No. | Cooling rate between 800° C. and 300° C. in intermediate annealing (° C./s) | Average heating rate between 500° C. and 700° C. in primary recrystallization annealing (° C./s) | Magnetic flux density $B_8$ (T) | Remarks |
| --- | --- | --- | --- | --- |
| 1 | 50 | 300 | 1.886 | Comparative Example |
| 2 | 50 | 500 | 1.889 | Comparative Example |
| 3 | 50 | 1000 | 1.891 | Comparative Example |
| 4 | 200 | 300 | 1.915 | Inventive Example |
| 5 | 200 | 500 | 1.920 | Inventive Example |
| 6 | 200 | 1000 | 1.926 | Inventive Example |
| 7 | 500 | 300 | 1.930 | Inventive Example |
| 8 | 500 | 500 | 1.935 | Inventive Example |
| 9 | 500 | 1000 | 1.935 | Inventive Example |
| 10 | 1000 | 300 | 1.936 | Inventive Example |
| 11 | 1000 | 500 | 1.936 | Inventive Example |
| 12 | 1000 | 1000 | 1.938 | Inventive Example |

Although the mechanism of largely increasing the magnetic flux density by increasing the average cooling rate from 800° C. to 300° C. in the cooling process of the intermediate annealing to not less than 200° C./s and heating at the heating rate of not less than 500° C./s between 500° C. and 700° C. in the heating process of the primary recrystallization annealing as mentioned above has not been yet clear sufficiently, the inventors consider as follows.

When the average cooling rate from 800° C. to 300° C. in the cooling process of the intermediate annealing is increased to not less than 200° C./s, it is considered, as mentioned in Experiment 1, that unusual strain is caused in the phase interface between γ-phase and α-phase. The cold rolling conducted at such a state supposedly causes a deformation band different from usual ones. In this deformation band, nucleation of {411} orientation grains having a high recrystallization temperature is easily caused, and hence to increase the heating rate in the heating process of the primary recrystallization annealing to such a very fast rate as not less than 500° C./s is considered to further increase {411}orientation grains to improve the texture, thereby causing great improvement in the magnetic properties.

The invention is developed based on the above novel knowledge.

Explanation will be made on the reason for limiting the component composition of the raw steel material (slab) used in the production of a grain-oriented electrical steel sheet according to the invention.

C:0.02 to 0.10 Mass %

When a C content is less than 0.02 mass %, the structure turns a single phase in casting or hot rolling, so that steel is embrittled to cause cracking in the slab or cause an edge cracking in the steel sheet after the hot rolling, which brings about difficulties in production. On the other hand, when the C exceeds 0.10 mass %, it is difficult to reduce the C content to not more than 0.005 mass % where no magnetic aging occurs in the decarburization annealing. Therefore, the C content is in the range of 0.02 to 0.10 mass %. Preferably, it is in the range of 0.025 to 0.050 mass %.

Si:2.0 to 5.0 mass %

Si is an element required for increasing a specific resistance of steel to thus improve iron loss. When it is less than 2.0 mass %, the above effect is not sufficient, while when it exceeds 5.0 mass %, the workability of steel is deteriorated to cause it difficult to produce the sheet by rolling. Therefore, the Si content is set in the range of 2.0 to 5.0 mass %. Preferably, it is set in the range of 2.5 to 4.0 mass %.

Mn:0.01 to 1.0 mass %

Mn is an element required for improving hot workability of steel. When the Mn content is less than 0.01 mass %, the above effect is not sufficient, while when it exceeds 1.0 mass %, the magnetic flux density of the product sheet lowers. Therefore, the Mn content is set in the range of 0.01 to 1.0 mass %, and more preferably in the range of 0.02 to 0.30 mass %.

sol.Al:0.01 to 0.04 mass %

As an element that forms AlN to be precipitates and acts as an inhibitor for suppressing normal grain growth in the finish annealing where secondary recrystallization is caused, Al is an important element in the production of a grain-oriented electrical steel sheet. However, when the Al content is less than 0.01 mass % as an acid-soluble Al (sol. Al), an absolute amount of the inhibitor is insufficient, leading to a lack of the power for suppressing normal grain growth. On the other hand, when the Al content exceeds 0.04 mass %, AlN is coarsened by Ostwald growth, also leading to a lack of the power for suppressing normal grain growth. Therefore, the Al content is, as sol. Al, in the range of 0.01 to 0.04 mass %, preferably in the range of 0.012 to 0.030 mass %.

N:0.004 to 0.020 mass %

N bonds with Al to form AlN to be an inhibitor and precipitated. When the N content is less than 0.004 mass %, the absolute amount of the inhibitor is insufficient so that the power for suppressing the normal grain growth is insufficient. On the other hand, when the N content exceeds 0.020 mass %, the slab may cause blister in hot rolling. Therefore, the N content is in the range of 0.004 to 0.020 mass %, preferably in the range of 0.006 to 0.010 mass %.

One or two selected from S and Se: 0.002 to 0.040 mass % in total

S and Se bond with Mn and form MnS and MnSe, which work as an inhibitor. However, when the contents of S and Se are less than 0.002 mass % alone or in total, the inhibitor effect cannot be obtained sufficiently. On the other hand, when it exceeds 0.040 mass %, the inhibitor is coarsened by Ostwald growth, and the power for suppressing the normal grain growth is insufficient. Therefore, the contents of S and Se are in the range of 0.002 to 0.040 mass % in total. Preferably, it is in a range of 0.005 to 0.030 mass %.

The remainder other than the above component composition of the raw steel material (slab) used in the production of a grain-oriented electrical steel sheet according to the invention is Fe and inevitable impurities. For the purpose of improving the magnetic properties, however, the raw steel material may contain one or more selected from Cr: 0.01o 0.50 mass %, Cu: 0.01 to 0.50 mass %, Ni: 0.01 to 0.50 mass %, Bi: 0.005 to 0.50 mass %, B: 0.0002 to 0.0025 mass %, Nb: 0.0010 to 0.0100 mass %, Sn: 0.010 to 0.400 mass %, Sb: 0.010 to 0.150 mass %, Mo: 0.010 to 0.200 mass %, P: 0.010 to 0.150 mass %, V: 0.0005 to 0.0100 mass % and Ti: 0.0005 to 0.0100 mass % in addition to the above component composition. Each element has an effect of improving the magnetic properties of the grain-oriented electrical steel sheet. However, when each content is smaller than the lower limit, the effect of improving the magnetic properties cannot be obtained sufficiently. On the other hand, when each content exceeds the upper limit, the development of the secondary recrystallized grains is suppressed and the magnetic properties may rather deteriorated.

There will be described the method for producing a grain-oriented electrical steel sheet according to the invention below.

A grain-oriented electrical steel sheet according to the invention can be produced by a method for producing a grain-oriented electrical steel sheet comprising a series of steps of heating a raw steel material (slab) having the aforementioned component composition to a given temperature, hot rolling the slab to form a hot-rolled sheet, subjecting the hot-rolled sheet to a hot-band annealing and to a single cold rolling or two or more cold rollings having an intermediate annealing between each cold rolling to form a cold-rolled sheet with a final sheet thickness, subjecting the cold-rolled sheet to a primary recrystallization annealing combined with a decarburization annealing, applying an annealing separator to the steel sheet surface, subjecting the steel sheet to finish annealing of causing secondary recrystallization and performing purification treatment, and conducting flattening annealing.

The raw steel material (slab) can be produced by a usual continuous casting method or ingot making-blooming method after a steel that has been adjusted to have the aforementioned component composition is melted by a usual refining process. Also, a thin cast slab having a thickness of not more than 100 mm may be produced by a direct casting method.

Then, the slab is heated to a temperature of higher than 1280° C. and hot rolled to form a hot-rolled sheet having a given sheet thickness. When the heating temperature for the slab is not higher than 1280° C., the added inhibitor-forming ingredients are not brought into the solid-solution state in steel sufficiently. A preferable slab heating temperature is not lower than 1300° C. As means for heating the slab, well-known means such as a gas furnace, an induction heating furnace, an electric furnace and so on can be used. Moreover, the hot rolling subsequent to the slab heating may be conducted under conventionally well-known conditions and is not particularly limited.

Next, the hot-rolled sheet obtained by the hot rolling is subjected to a hot-band annealing for the purpose of complete recrystallization of the structure of the hot-rolled sheet. The maximum achieving temperature in the hot-bad annealing is preferable to be not lower than 950° C. from a viewpoint of surely obtaining the above effect. More preferably, it is not lower than 1000° C. On the other hand, when the maximum achieving temperature exceeds 1200° C., crystal grains after the hot-band annealing are coarsened, which makes it difficult to provide a primary recrystallization texture of size-regulated grains. Accordingly, the temperature is limited to not higher than 1200° C. More preferably, it is not higher than 1150° C. Moreover, the duration for holding the maximum achieving temperature is preferable to fall within the range of 5 to 300 seconds from a viewpoint of sufficiently obtaining the effect of the hot-band annealing and ensuring productivity.

Then, the hot-rolled sheet after the hot-band annealing is subjected to pickling for descaling and then to a single cold rolling or two or more cold rollings having an intermediate annealing between each cold rolling to form a cold-rolled sheet having a final sheet thickness. When two or more cold rollings are to be conducted, an annealing temperature in the intermediate annealing is preferable to fall within the range of 1000 to 1200° C. When the annealing temperature is lower than 1000° C., it is difficult to complete recrystallization, while when it exceeds 1200° C., crystal grains after the annealing are coarsened, and hence it is difficult to obtain primary recrystallization texture of size-regulated grains. More preferably, it falls within the range of 1020 to 1150° C. Moreover, a soaking time of the intermediate annealing is preferable to be in the range of 5 to 300 seconds from a viewpoint of sufficiently obtaining the effect of annealing and ensuring productivity.

It is most important in the invention that, in the annealing before the cold rolling, concretely in at least one of the hot-band annealing and the intermediate annealing, it is necessary to conduct a rapid cooling at an average cooling rate of not less than 200° C./s between 800° C. and 300° C. in the cooling process from the maximum achieving temperature. As described above, cooling at the average cooling rate of not less than 200° C./s in the above temperature range causes large strain to be introduced into the interior of the steel sheet after the cooling and leads to an improvement in the texture of the steel sheet after the primary recrystallization annealing, whereby the magnetic properties of the product sheet can be improved. The average cooling rate is preferably not less than 300° C./s. In order to industrially attain the cooling rate, the rapid cooling device for jetting water as described in the above Patent Literature 5 and the like can be used favorably. Although the upper limit of the cooling rate is not particularly defined, the upper limit of the cooling rate in the above rapid cooling device is about 1200° C./s.

Next, it is important in the invention that the cooling from 300° C. to 100° C. subsequent to the rapid cooling between 800° C. and 300° C. is preferably conducted at an average cooling rate of 5 to 40° C./s. Thus, strain quantity in the steel sheet after the annealing can be more increased to further improve the magnetic properties. More preferably, the average cooling rate falls within the range of 20 to 40° C./s.

Thereafter, the steel sheet with the final sheet thickness after the cold rolling (cold-rolled sheet) is subjected to a primary recrystallization annealing combined with a decarburization annealing. The primary recrystallization annealing is preferable to be conducted at a soaking temperature of 800 to 900° C. for a soaking time 50 to 300 seconds, from a viewpoint of securing decarburization property. The annealing atmosphere is preferable to be a wet atmosphere from a viewpoint of securing the decarburization property. The decarburization annealing allows the C content in the steel sheet to be reduced to not more than 0.0050 mass %. Further, the texture is further improved by increasing the temperature at a heating rate of not less than 500° C./s between 500° C. and 700° C. being the recrystallization temperature zone in the heating process of the primary recrystallization annealing to thus improve the magnetic properties. Desirably, the heating rate is not less than 600° C./s.

Then, the steel sheet after the primary recrystallization annealing is, in a case where a forsterite coating is to be formed in a finish annealing, coated with an annealing separator composed mainly of MgO on the steel sheet surface and thereafter subjected to the finish annealing of causing a secondary recrystallization and conducting a purification treatment. Whereas, in a case where blanking workability is considered important and thus the forsterite coating is not to be formed, the annealing separator is not applied or an annealing separator composed mainly of silica, alumina or the like is applied to the steel sheet surface and then the finish annealing is conducted.

It is preferable to conduct a temperature holding treatment of holding an arbitrary temperature between 800° C. and 950° C. for 5 to 200 hours in the heating process of the finish annealing. Alternatively, it is preferable to heat between 800° C. and 950° C. at an average heating rate of not more than 5° C./hr to develop secondary recrystallization, subsequently, or after lowering the temperature to not higher than 700° C. once, reheat, increase the temperature between 950° C. and 1050° C. at an average heating rate of 5 to 35° C./hr up to not lower than 1100° C. to complete the secondary recrystallization, and thereafter conduct a purification treatment of holding the temperature for not less than 2 hours. The purification treatment allows Al, N, S and Se in the steel sheet to be decreased to the level of inevitable impurities.

A preferable temperature holding time between 800° C. and 950° C. is 50 to 150 hours, and a preferable average heating rate between 800° C. and 950° C. is 1 to 3° C./hr. Also, a preferable average heating rate between 950° C. and 1050° C. is 10 to 20° C./hr, and a preferable temperature and a preferable holding time in the purification treatment are 1200 to 1250° C. and 2 to 10 hours, respectively. Moreover, an atmosphere of the purification treatment in the finish annealing is preferable to be $H_2$ atmosphere.

The steel sheet after the finish annealing is subjected to a water washing, a brushing, a pickling or the like to remove unreacted annealing separator, and then subjected to a flattening annealing for a shape correction, which is effective for reducing the iron loss. When the steel sheets are laminated for use, it is preferable to apply an insulation coating onto the steel sheet surface in the flattening annealing or before or after the flattening annealing, in order to improve the iron loss. Moreover, it is preferable to use a tension-imparting coating as the insulation coating to further reduce the iron loss. In this case, it is possible to adopt a method of forming the tension-imparting coating through a binder, or a method of depositing an inorganic matter onto the steel sheet surface by a physical vapor deposition method or a chemical vapor deposition method to use as the tension-imparting coating. In order to further reduce the iron loss, it is preferable to conduct a magnetic domain subdividing treatment by irradiating a laser beam, plasma beam or the like onto the surface of the product sheet to apply heat strain or impact strain, or by forming grooves in the steel sheet surface.

Example 1

A steel slab having a component composition shown in Table 3 and the remainder being Fe and inevitable impurities is produced by a continuous casting method, reheated to a temperature of 1350° C., hot rolled to form a hot-rolled sheet having a sheet thickness of 2.5 mm, and then subjected to a hot-band annealing at 1050° C. for 20 seconds. In this case, average cooling rates between 800° C. and 300° C. and between 300° C. and 100° C. in the cooling process of the hot-band annealing and intermediate annealing are varied as shown in Table 4. The hot-rolled sheet is thereafter subjected to pickling, the first cold rolling to roll to a middle sheet thickness of 1.3 mm, an intermediate annealing at 1060° C. for 60 seconds, and then the second cold rolling to form a cold-rolled sheet having a final sheet thickness of 0.23 mm. The cold-rolled sheet is subjected to a primary recrystallization annealing combined with a decarburization annealing at 830° C. in a wet atmosphere of 60 vol % $H_2$-40 vol % $N_2$ with a dew point of 55° C. for 150 seconds. In this case, the average heating rate between 500° C. and 700° C. in the heating process is 200° C./s.

Next, an annealing separator composed mainly of MgO is applied onto the surface of the steel sheet after the primary recrystallization annealing, and thereafter the steel sheet is subjected to a finish annealing by heating (no temperature holding) between 800° C. and 950° C. at a heating rate of 10° C./hr to develop secondary recrystallization, subsequently heating to 1200° C. at a heating rate of 15° C./hr between 950° C. and 1050° C. to complete secondary recrystallization and conducting a purification treatment of holding at such a temperature in a hydrogen atmosphere for 10 hours.

A test specimen is taken out from the thus-obtained steel sheet after the finish annealing and a magnetic flux density Bs (magnetic flux density excited at 800 A/m) thereof is measured by a method described in JIS C2550 to obtain results shown in Table 4. As seen from Table 4, all of the steel sheets obtained by using the raw steel material having the component composition adapted to the invention and performing the rapid cooling in the hot-band annealing and/or the intermediate annealing under the conditions adapted to the invention have an excellent magnetic flux density, and particularly the faster the cooling rate between 800° C. and 300° C., the more excellent the magnetic flux density.

TABLE 3

| Steel symbol | Component composition (mass %) | | | | | | | | | Remarks |
|---|---|---|---|---|---|---|---|---|---|---|
| | C | Si | Mn | sol.Al | N | S | Se | S + Se | Others | |
| A | 0.015 | 2.2 | 0.500 | 0.025 | 0.004 | 0.010 | 0.010 | 0.020 | — | Comparative steel |
| B | 0.110 | 2.9 | 0.012 | 0.023 | 0.004 | 0.013 | 0.011 | 0.024 | — | Comparative steel |
| C | 0.020 | 1.8 | 0.010 | 0.025 | 0.007 | 0.012 | 0.009 | 0.021 | — | Comparative steel |
| D | 0.052 | 3.0 | 0.004 | 0.018 | 0.006 | 0.010 | 0.008 | 0.018 | — | Comparative steel |
| E | 0.061 | 3.5 | 0.600 | 0.018 | 0.008 | 0.010 | 0.010 | 0.020 | — | Comparative steel |
| F | 0.050 | 3.0 | 0.080 | 0.008 | 0.008 | 0.015 | 0.015 | 0.030 | — | Comparative steel |
| G | 0.060 | 3.5 | 0.010 | 0.043 | 0.006 | 0.011 | 0.001 | 0.012 | — | Comparative steel |
| H | 0.040 | 3.0 | 0.080 | 0.022 | 0.003 | 0.009 | 0.015 | 0.024 | — | Comparative steel |
| I | 0.049 | 3.4 | 0.050 | 0.035 | 0.023 | 0.001 | 0.008 | 0.009 | — | Comparative steel |
| J | 0.060 | 3.4 | 0.051 | 0.017 | 0.010 | 0.021 | 0.020 | 0.041 | — | Comparative steel |
| K | 0.049 | 3.5 | 0.051 | 0.022 | 0.013 | — | 0.042 | 0.042 | — | Comparative steel |
| L | 0.050 | 3.5 | 0.052 | 0.033 | 0.019 | 0.002 | 0.015 | 0.017 | — | Inventive steel |
| M | 0.061 | 2.0 | 0.300 | 0.023 | 0.017 | 0.010 | 0.005 | 0.015 | — | Inventive steel |
| N | 0.041 | 4.5 | 0.050 | 0.025 | 0.019 | 0.005 | — | 0.005 | — | Inventive steel |
| O | 0.052 | 2.5 | 0.019 | 0.037 | 0.019 | 0.020 | 0.001 | 0.021 | — | Inventive steel |
| P | 0.061 | 3.0 | 0.020 | 0.029 | 0.019 | 0.020 | 0.003 | 0.023 | — | Inventive steel |
| Q | 0.060 | 3.2 | 0.071 | 0.026 | 0.018 | 0.020 | — | 0.020 | — | Inventive steel |
| R | 0.059 | 3.0 | 0.100 | 0.033 | 0.012 | — | 0.005 | 0.005 | — | Inventive steel |
| S | 0.060 | 3.5 | 0.051 | 0.024 | 0.013 | 0.004 | 0.015 | 0.019 | Sb: 0.015, P: 0.05, Cu: 0.015 | Inventive steel |
| T | 0.061 | 3.5 | 0.050 | 0.025 | 0.005 | 0.010 | 0.008 | 0.018 | Cr: 0.06, Sb: 0.08, Sn: 0.03, Mo: 0.08 | Inventive steel |
| U | 0.059 | 3.5 | 0.049 | 0.036 | 0.005 | 0.010 | 0.010 | 0.020 | Ni: 0.05, Sn: 0.1 | Inventive steel |
| V | 0.060 | 3.5 | 0.050 | 0.015 | 0.005 | 0.015 | 0.015 | 0.030 | Nb: 0.002, Cr: 0.07 | Inventive steel |
| W | 0.052 | 3.3 | 0.051 | 0.024 | 0.016 | 0.015 | 0.003 | 0.018 | Cu: 0.20, Bi: 0.005, V: 0.002 | Inventive steel |
| X | 0.061 | 3.3 | 0.050 | 0.033 | 0.017 | 0.009 | 0.002 | 0.011 | P: 0.09, Sb: 0.140, B: 0.0010, Cu: 0.05 | Inventive steel |
| Y | 0.060 | 3.0 | 0.049 | 0.024 | 0.018 | 0.009 | 0.001 | 0.010 | Bi: 0.008, B: 0.0005, Nb: 0.008 | Inventive steel |
| Z1 | 0.049 | 3.3 | 0.050 | 0.026 | 0.019 | 0.002 | 0.008 | 0.010 | — | Inventive steel |
| Z2 | 0.060 | 3.5 | 0.069 | 0.037 | 0.019 | 0.008 | — | 0.008 | — | Inventive steel |

TABLE 4

| No. | Steel symbol | Cooling rate in hot-band annealing (° C./s) | | Cooling rate in Intermediate annealing (° C./s) | | Magnetic flux density $B_8$(T) | Remarks |
|---|---|---|---|---|---|---|---|
| | | 800° C. to 300° C. | 300° C. to 100° C. | 800° C. to 300° C. | 300° C. to 100° C. | | |
| 1 | A | 40 | 40 | 500 | 500 | 1.780 | Comparative Example |
| 2 | B | 40 | 40 | 500 | 500 | 1.826 | Comparative Example |
| 3 | C | 40 | 40 | 500 | 500 | 1.852 | Comparative Example |
| 4 | D | 40 | 40 | 500 | 500 | 1.656 | Comparative Example |
| 5 | E | 40 | 40 | 500 | 500 | 1.869 | Comparative Example |
| 6 | F | 40 | 40 | 500 | 500 | 1.632 | Comparative Example |
| 7 | G | 40 | 40 | 500 | 500 | 1.704 | Comparative Example |
| 8 | H | 40 | 40 | 500 | 500 | 1.738 | Comparative Example |

TABLE 4-continued

| No. | Steel symbol | Cooling rate in hot-band annealing (° C./s) 800° C. to 300° C. | Cooling rate in hot-band annealing (° C./s) 300° C. to 100° C. | Cooling rate in Intermediate annealing (° C./s) 800° C. to 300° C. | Cooling rate in Intermediate annealing (° C./s) 300° C. to 100° C. | Magnetic flux density $B_8(T)$ | Remarks |
|---|---|---|---|---|---|---|---|
| 9 | I | 40 | 40 | 500 | 500 | 1.706 | Comparative Example |
| 10 | J | 40 | 40 | 500 | 500 | 1.738 | Comparative Example |
| 11 | K | 40 | 40 | 500 | 500 | 1.755 | Comparative Example |
| 12 | L | 40 | 40 | 500 | 500 | 1.925 | Inventive Example |
| 13 | M | 40 | 40 | 500 | 500 | 1.923 | Inventive Example |
| 14 | N | 40 | 40 | 500 | 500 | 1.926 | Inventive Example |
| 15 | O | 40 | 40 | 500 | 500 | 1.929 | Inventive Example |
| 16 | P | 40 | 40 | 500 | 500 | 1.926 | Inventive Example |
| 17 | Q | 40 | 40 | 500 | 500 | 1.927 | Inventive Example |
| 18 | R | 40 | 40 | 500 | 500 | 1.926 | Inventive Example |
| 19 | S | 40 | 40 | 500 | 500 | 1.932 | Inventive Example |
| 20 | T | 40 | 40 | 500 | 500 | 1.936 | Inventive Example |
| 21 | U | 40 | 40 | 500 | 500 | 1.936 | Inventive Example |
| 22 | V | 40 | 40 | 500 | 500 | 1.939 | Inventive Example |
| 23 | W | 40 | 40 | 500 | 500 | 1.938 | Inventive Example |
| 24 | X | 40 | 40 | 500 | 500 | 1.936 | Inventive Example |
| 25 | Y | 40 | 40 | 500 | 500 | 1.935 | Inventive Example |
| 26 | Z1 | 40 | 40 | 500 | 500 | 1.924 | Inventive Example |
| 27 | Z1 | 40 | 40 | 500 | 10 | 1.930 | Inventive Example |
| 28 | Z1 | 40 | 40 | 500 | 30 | 1.933 | Inventive Example |
| 29 | Z1 | 40 | 40 | 500 | 40 | 1.932 | Inventive Example |
| 30 | Z1 | 40 | 40 | 40 | 40 | 1.904 | Inventive Example |
| 31 | Z1 | 500 | 500 | 500 | 500 | 1.935 | Inventive Example |
| 32 | Z1 | 500 | 60 | 500 | 60 | 1.938 | Inventive Example |

Example 2

A steel slab containing C: 0.060 mass %, Si: 3.5 mass %, Mn: 0.069 mass %, sol. Al: 0.037 mass %, N: 0.019 mass %, S: 0.008 mass % and the remainder being Fe and inevitable impurities is produced by a continuous casting method, reheated to a temperature of 1300° C. and hot rolled to form a hot-rolled sheet having a sheet thickness of 2.0 mm. The hot-rolled sheet is subjected to a hot-band annealing at 1100° C. for 40 seconds. In this case, average cooling rates between 800° C. and 300° C. and between 300° C. and 100° C. in the cooling process of the hot-band annealing are varied as shown in Table 5. The sheet is thereafter subjected to a single cold rolling to form a cold-rolled sheet having a final sheet thickness of 0.20 mm. The cold-rolled sheet is subjected to a primary recrystallization annealing combined with a decarburization annealing at 850° C. in a wet atmosphere of 55 vol % $H_2$-45 vol % $N_2$ with a dew point of 60° C. for 60 seconds. In this case, the average heating rate between 500° C. and 700° C. in the heating process is 400° C./s.

An annealing separator composed mainly of MgO is applied to the steel sheet surface after the primary recrystallization annealing. Then, the steel sheet is subjected to a finish annealing comprising heating (no temperature holding) between 800° C. and 950° C. at a heating rate of 20° C./hr to develop secondary recrystallization, subsequently heating to 1225° C. at a heating rate of 35° C./hr between 950° C. and 1050° C. to complete the secondary recrystallization and performing a purification treatment of holding such a temperature in a hydrogen atmosphere for 10 hours.

A test specimen is taken out from the thus-obtained steel sheet after the finish annealing, and a magnetic flux density $B_g$ (magnetic flux density excited at 800 A/m) thereof is measured by a method described in JIS C2550 to obtain results shown in Table 5. As seen from Table 5, all of the steel sheets obtained by using the raw steel material having the component composition adapted to the invention and performing the hot-band annealing under the conditions adapted to the invention are excellent in the magnetic flux density.

TABLE 5

| No. | Cooling rate in hot-band annealing (° C./s) Between 800° C. and 300° C. | Cooling rate in hot-band annealing (° C./s) Between 300° C. and 100° C. | Magnetic flux density $B_8(T)$ | Remarks |
|---|---|---|---|---|
| 1 | 300 | 300 | 1.922 | Inventive Example |
| 2 | 30 | 30 | 1.901 | Comparative Example |
| 3 | 300 | 30 | 1.929 | Inventive Example |

Example 3

A steel slab comprising C: 0.060 mass %, Si: 3.5 mass %, Mn: 0.069 mass %, sol. Al: 0.037 mass %, N: 0.019 mass %, S: 0.008 mass % and the remainder being Fe and inevitable impurities as used in Example 2 is produced by a continuous casting method, reheated to a temperature of 1300° C. and hot rolled to form a hot-rolled sheet having a sheet thickness of 2.8 mm. The hot-rolled sheet is subjected to a hot-band annealing at 1050° C. for 60 seconds. In this case, average cooling rates between 800° C. and 300° C. and between 300° C. and 100° C. in the cooling process of the hot-band annealing are varied as shown in Table 6. Thereafter, the steel sheet is subjected to the first cold rolling to roll to a middle sheet thickness of 1.8 mm, an intermediate annealing at 1080° C. for 60 seconds and the second cold rolling to form a cold-rolled sheet having a final sheet thickness of 0.23 mm. In this case, the average cooling rate between 800° C. and 100° C. in the cooling process of the intermediate annealing is 40° C./s.

Then, the cold-rolled sheet is subjected to a primary recrystallization annealing combined with a decarburization annealing at 850° C. in a wet atmosphere of 55 vol % H$_2$-45 vol % N$_2$ with a dew point of 58° C. for 100 seconds. In this case, the average heating rates between 500° C. and 700° C. in the heating process are varied as shown in Table 6. An annealing separator composed mainly of MgO is applied onto the surface of the steel sheet after the primary recrystallization annealing, and the steel sheet is subjected to a finish annealing of completing the secondary recrystallization and then performing a purification treatment of holding at a temperature of 1225° C. in a hydrogen atmosphere for 10 hours. In this case, heating conditions for completing the secondary recrystallization in the finish annealing (heating conditions for developing secondary recrystallization between 800° C. and 950° C., presence or absence of subsequent temperature dropping to 680° C., and average heating rate between 950° C. and 1050° C.) are varied as shown in Table 6.

A test sample is taken out from the thus-obtained steel sheet after the finish annealing, and a magnetic flux density B$_g$(magnetic flux density excited at 800 A/m) thereof is measured by a method described in JIS C2550 to obtain results shown in Table 6. As seen from Table 6, the magnetic flux density of the product sheet is more increased by performing the temperature holding treatment for not less than 5 hours between 800° C. and 950° C. or by raising the temperature at not more than 5° C./s between 800° C. and 950° C. in the heating process of the finish annealing, regardless of the presence or absence of subsequent temperature dropping to 680° C. Also, the magnetic flux density is further increased by increasing the average heating rate between 500° C. and 700° C. in the heating process of the primary recrystallization annealing to not less than 500° C./s.

The invention claimed is:

1. A method for producing a grain-oriented electrical steel sheet comprising a series of steps of heating a steel slab having a component composition comprising C: 0.02 to 0.10 mass %, Si: 2.0 to 5.0 mass %, Mn: 0.01 to 1.00 mass %, sol. Al: 0.010 to 0.040 mass %, N: 0.004 to 0.020 mass %, one or two selected from S and Se: 0.002 to 0.040 mass % in total, and the remainder being Fe and inevitable impurities to a temperature higher than 1280° C., hot rolling the steel slab to form a hot-rolled sheet, subjecting the hot-rolled sheet to a hot-band annealing and then a single cold rolling or two or more cold rollings having an intermediate annealing between each cold rolling to form a cold-rolled sheet having a final sheet thickness, subjecting the cold-rolled sheet to a primary recrystallization annealing combined with a decarburization annealing, applying an annealing separator onto a surface of the steel sheet, and subjecting the steel sheet to a finish annealing and a flattening annealing, wherein a rapid cooling is conducted at an average cooling rate of not less than 200° C./s throughout the entire temperature range of from 800° C. to 300° C. in a cooling process from a maximum achieving temperature of above 800° C. in at least one process of the hot-band annealing and the intermediate annealing, and subsequently to the rapid cooling, a cooling is conducted from 300° C. to 100° C. at an average cooling rate of 5 to 40° C./s.

TABLE 6

| No. | Cooling rate in hot-band annealing (° C./s) Between 800° C. and 300° C. | Cooling rate in hot-band annealing (° C./s) Between 300° C. and 100° C. | Average heating rate between 500° C. and 700° C. in primary recrystallization annealing (° C./s) | Finish Annealing conditions Heating conditions between 800° C. and 950° C. (average heating rate, temperature holding conditions) | Presence or absence of temperature dropping to 680° C. | Average heating rate between 950° C. and 1050° C.(° C./hr) | Magnetic flux density B$_8$(T) | Remarks |
|---|---|---|---|---|---|---|---|---|
| 1 | 300 | 300 | 300 | Heating at 35° C./hr, no temperature holding | Absence | 20 | 1.927 | Inventive Example |
| 2 | 300 | 300 | 300 | Heating at 30° C./hr, no temperature holding | Absence | 20 | 1.929 | Inventive Example |
| 3 | 300 | 300 | 300 | Heating at 10° C./hr, no temperature holding | Absence | 20 | 1.930 | Inventive Example |
| 4 | 300 | 300 | 300 | Heating at 1° C./hr, no temperature holding | Absence | 20 | 1.930 | Inventive Example |
| 5 | 300 | 300 | 300 | Temperature holding at 850° C. for 100 hr | Absence | 20 | 1.933 | Inventive Example |
| 6 | 300 | 300 | 300 | Heating at 5° C./hr, no temperature holding | Absence | 5 | 1.929 | Inventive Example |
| 7 | 300 | 300 | 300 | Heating at 5° C./hr, no temperature holding | Absence | 35 | 1.928 | Inventive Example |
| 8 | 300 | 30 | 300 | Heating at 5° C./hr, no temperature holding | Absence | 35 | 1.937 | Inventive Example |
| 9 | 300 | 300 | 300 | Heating at 5° C./hr, no temperature holding | Presence | 20 | 1.932 | Inventive Example |
| 10 | 300 | 30 | 500 | Heating at 5° C./hr, no temperature holding | Absence | 35 | 1.939 | Inventive Example |
| 11 | 300 | 30 | 700 | Heating at 5° C./hr, no temperature holding | Absence | 35 | 1.939 | Inventive Example |
| 12 | 300 | 30 | 1000 | Heating at 5° C./hr, no temperature holding | Absence | 35 | 1.940 | Inventive Example |
| 13 | 300 | 30 | 1500 | Heating at 5° C./hr, no temperature holding | Absence | 35 | 1.942 | Inventive Example |

2. The method for producing a grain-oriented electrical steel sheet according to claim 1, wherein
a heating rate between 500° C. and 700° C. in a heating process of the primary recrystallization annealing combined with the decarburization annealing is not less than 500° C./s.

3. The method for producing a grain-oriented electrical steel sheet according to claim 1, wherein, in a heating process of the finish annealing, either
(i) after a temperature holding treatment holding any temperature between 800° C. and 950° C. for 5 to 200 hours, or
(ii) after a heating is conducted between 800° C. and 950° C. at an average heating rate of not more than 5° C./hr to develop secondary recrystallization and further continued up to a purification temperature not lower than 1100° C. to complete the secondary recrystallization,
a purification treatment of holding the purification temperature for not less than 2 hours is conducted.

4. The method for producing a grain-oriented electrical steel sheet according to claim 2, wherein, in a heating process of the finish annealing, either
(i) after a temperature holding treatment holding any temperature between 800° C. and 950° C. for 5 to 200 hours, or
(ii) after a heating is conducted between 800° C. and 950° C. at an average heating rate of not more than 5° C./hr to develop secondary recrystallization and further continued up to a purification temperature not lower than 1100° C. to complete the secondary recrystallization,
a purification treatment of holding the purification temperature for not less than 2 hours is conducted.

5. The method for producing a grain-oriented electrical steel sheet according to claim 1, wherein the component composition of the steel slab further contains one or more selected from
Cr: 0.01 to 0.50 mass %,
Cu: 0.01 to 0.50 mass %,
Ni: 0.01 to 0.50 mass %,
Bi: 0.005 to 0.50 mass %,
B: 0.0002 to 0.0025 mass %,
Nb: 0.0010 to 0.0100 mass %,
Sn: 0.010 to 0.400 mass %,
Sb: 0.010 to 0.150 mass %,
Mo: 0.010 to 0.200 mass %,
P: 0.010 to 0.150 mass %,
V: 0.0005 to 0.0100 mass % and
Ti: 0.0005 to 0.0100 mass %.

6. The method for producing a grain-oriented electrical steel sheet according to claim 2, wherein the component composition of the steel slab further contains one or more selected from
Cr: 0.01 to 0.50 mass %,
Cu: 0.01 to 0.50 mass %,
Ni: 0.01 to 0.50 mass %,
Bi: 0.005 to 0.50 mass %,
B: 0.0002 to 0.0025 mass %,
Nb: 0.0010 to 0.0100 mass %,
Sn: 0.010 to 0.400 mass %,
Sb: 0.010 to 0.150 mass %,
Mo: 0.010 to 0.200 mass %,
P: 0.010 to 0.150 mass %,
V: 0.0005 to 0.0100 mass % and
Ti: 0.0005 to 0.0100 mass %.

7. The method for producing a grain-oriented electrical steel sheet according to claim 3, wherein the component composition of the steel slab further contains one or more selected from
Cr: 0.01 to 0.50 mass %,
Cu: 0.01 to 0.50 mass %,
Ni: 0.01 to 0.50 mass %,
Bi: 0.005 to 0.50 mass %,
B: 0.0002 to 0.0025 mass %,
Nb: 0.0010 to 0.0100 mass %,
Sn: 0.010 to 0.400 mass %,
Sb: 0.010 to 0.150 mass %,
Mo: 0.010 to 0.200 mass %,
P: 0.010 to 0.150 mass %,
V: 0.0005 to 0.0100 mass % and
Ti: 0.0005 to 0.0100 mass %.

8. The method for producing a grain-oriented electrical steel sheet according to claim 4, wherein the component composition of the steel slab further contains one or more selected from
Cr: 0.01 to 0.50 mass %,
Cu: 0.01 to 0.50 mass %,
Ni: 0.01 to 0.50 mass %,
Bi: 0.005 to 0.50 mass %,
B: 0.0002 to 0.0025 mass %,
Nb: 0.0010 to 0.0100 mass %,
Sn: 0.010 to 0.400 mass %,
Sb: 0.010 to 0.150 mass %,
Mo: 0.010 to 0.200 mass %,
P: 0.010 to 0.150 mass %,
V: 0.0005 to 0.0100 mass % and
Ti: 0.0005 to 0.0100 mass %.

* * * * *